United States Patent [19]

Suganuma

[11] Patent Number: 5,010,222
[45] Date of Patent: Apr. 23, 1991

[54] DRIVING DEVICE FOR ULTRASONIC WAVE MOTOR

[75] Inventor: Ryoichi Suganuma, Yokohama, Japan

[73] Assignee: Nikon Corporation, Tokyo, Japan

[21] Appl. No.: 533,410

[22] Filed: Jun. 5, 1990

[30] Foreign Application Priority Data

Jun. 8, 1989 [JP] Japan ................... 1-146261

[51] Int. Cl.$^5$ ............................. H01L 41/08
[52] U.S. Cl. ..................... 318/116; 310/316
[58] Field of Search ............ 310/316, 317, 323; 318/116

[56] References Cited

U.S. PATENT DOCUMENTS

| | | | |
|---|---|---|---|
| 3,530,364 | 9/1970 | Nelson et al. | 363/134 |
| 3,706,022 | 12/1972 | Corey et al. | 363/134 |
| 4,311,920 | 1/1982 | Smollinger | 307/66 |
| 4,510,411 | 4/1985 | Hakamata et al. | 310/316 |
| 4,691,275 | 9/1987 | Moscovici | 363/17 |
| 4,935,861 | 6/1990 | Johnson, Jr. et al. | 307/46 |

FOREIGN PATENT DOCUMENTS

59-111609 6/1984 Japan .

Primary Examiner—Mark O. Budd
Attorney, Agent, or Firm—Shapiro and Shapiro

[57] ABSTRACT

A driving device for an ultrasonic wave motor provided with:
  a stator member having an electrostrictive member and a resilient member, and adapted to generate a travelling vibration wave on the resilient member by excitation with the electrostrictive member; and
  a moving member maintained in pressure contact with the stator member and driven by the travelling vibration wave, comprising:
a drive signal forming circuit for forming AC voltage signals for the high-speed drive and the low-speed drive for application to the electrostrictive member;
wherein the electrostrictive member is excited into vibration by the AC voltage signal;
a switching circuit for selectively switching the AC voltage signals for the high-speed drive and the low-speed drive for application to the electrostrictive member; and
a temporary stop circuit for reducing the frequency of the AC voltage signal, supplied to the electrostrictive member, at zero at least once at the switching from the high-speed drive state to the low-speed drive state.

7 Claims, 6 Drawing Sheets

DRIVING DEVICE FOR ULTRASONIC WAVE MOTOR

BACKGROUND OF THE INVENTION

1. Field of the Invention

The present invention relates to a driving device for an ultrasonic wave motor in which a movable member is driven by travelling vibration wave generated in a resilient member by a piezoelectric member.

2. Related Background Art

As disclosed for example in the Japanese Patent Application Laid-open No. 59-111609, the ultrasonic wave motor utilizing travelling vibration wave causes a bending vibration in a piezoelectric member by applying an AC voltage thereto, thus generating a travelling vibration wave in a resilient member on which said piezoelectric member is attached, and drives by friction a rotor maintained in contact with said resilient member.

The speed reduction in such ultrasonic wave motor has been achieved either by switching the frequency of the applied AC voltage to a frequency corresponding to the desired lower speed, or by switching said AC voltage to a lower voltage.

However said frequency switching method is unable to cancel the inertia of the load connected to the rotor at the switching of frequency of the AC voltage and requires a long decelerating time, because:

(1) there is a delay in time, after the frequency switching, before the amplitude of the vibration wave generated in the resilient member reaches a value corresponding to the lower speed; and (2) in the presence of the vibration wave, the resilient member and the rotor have low frictional force therebetween as they mutually contact at the peaks of the vibration wave.

Also said AC voltage switching method has a drawback of requiring a long decelerating time due to similar reasons.

SUMMARY OF THE INVENTION

The object of the present invention is to decelerate the ultrasonic wave motor from a high speed drive state to a lower speed drive state within a short time.

Figure 1:
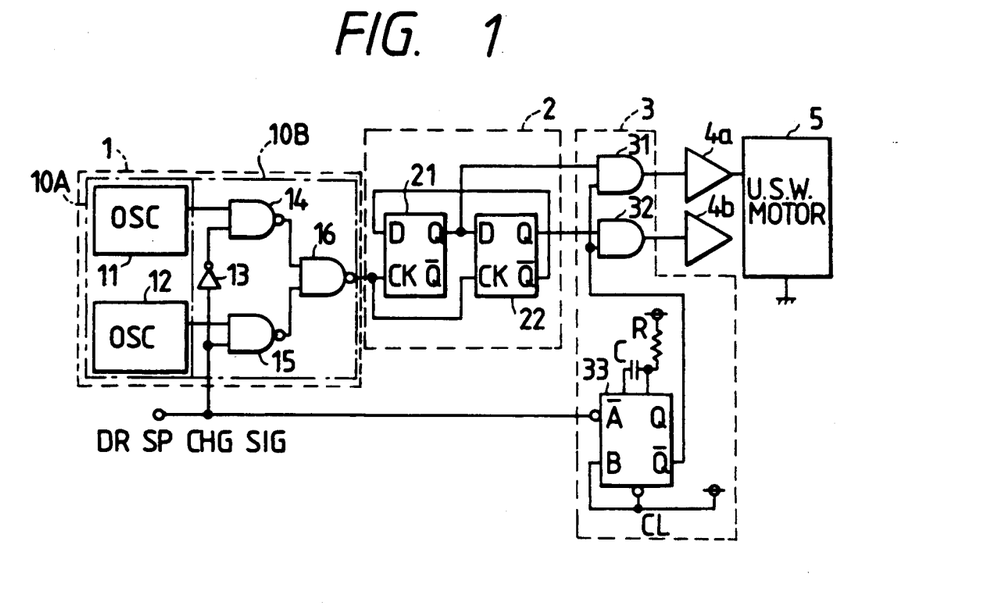
FIG. 1 is a block diagram of a first embodiment of the present invention.

The foregoing object is achieved, according to the present invention, as shown in FIG. 1 illustrating an embodiment thereof, by drive signal forming means 10A for generating high-speed driving and low-speed driving AC voltage signals to be applied to the piezoelectric member; switch means 10B for selectively switching said high- and low-speed driving AC voltage signals for supply to said piezoelectric member; and temporary stop means 3 for shifting the frequency of the AC voltage signal applied to said piezoelectric member at least to zero for a predetermined period at the switching from the high-speed drive to the low-speed drive. Said temporary stop means 3 is adapted to shift said frequency to zero, either by intercepting the AC voltage signal for a predetermined period, or by changing said AC voltage signal to a DC component only.

When the frequency of the AC voltage applied to the piezoelectric material is temporarily shifted to zero for a predetermined period, the frictional force between the resilient member and the movable member suddenly increases, whereby the movable member is rapidly decelerated. Consequently the switching from the high-speed to the low-speed state can be achieved within a short time.

In the foregoing description, the drawing of an embodiment of the present invention has been employed for the ease of understanding, but the present invention is by no means limited to such embodiment.

DESCRIPTION OF THE PREFERRED EMBODIMENTS

First Embodiment

Figure 2A:
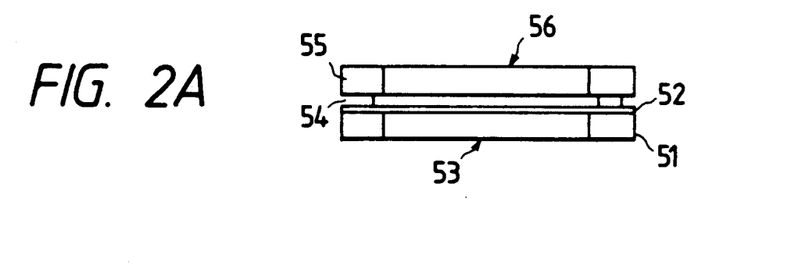
FIGS. 2A and 2B are respectively a cross-sectional view and a perspective view schematically showing the structure of an ultrasonic wave motor.
Figure 2B:
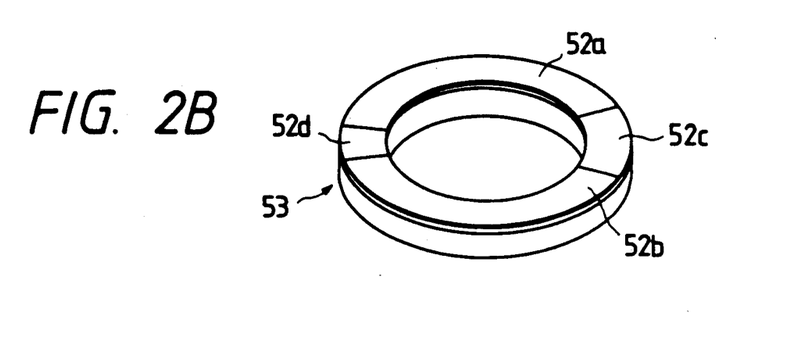

FIG. 1 is a block diagram showing an embodiment of the present invention, FIG. 2A is a cross-sectional view showing the schematic structure of an ultrasonic wave motor, and FIG. 2B is a perspective view of a vibration member composed of a piezoelectric member and a resilient member.

At first the structure of the ultrasonic wave motor will be explained with reference to FIGS. 2A and 2B. A vibration member 53 is composed of a resilient member 51 and a piezoelectric member 52 adhered on a surface thereof. A rotor 55 is maintained in pressure contact, across a slider 54, with the other surface of the piezoelectric member 52, and said slider 54 and rotor 55 constitute a rotary member 56.

As shown in FIG. 2B, the piezoelectric member 52 is provided, on the surface thereof, with four electrodes 52a, 52b, 52c, 52d, in which the electrodes 52a and 52b respectively receive AC voltages of a mutual phase difference of $\pi/2$, while the electrode 52c is grounded. The electrode 52d is used for obtaining a monitor signal. Such structure and the functions thereof will not be explained further, as they are already known for example by the U.S. Pat. No. 4,510,411.

Now referring to FIG. 1, there are shown a drive speed changing circuit 1 composed of a drive signal forming circuit 10A and a switching circuit 10B; a frequency dividing and phase shifting circuit 2; a temporary stop circuit 3; power amplifiers 4a, 4b; and an ultrasonic wave motor 5.

The drive speed changing circuit 1 is provided with two oscillators 11, 12; an inverter 13; and NAND gates 14-16, and a drive speed changing signal is supplied to the inverter 13 and an input terminal of the NAND gate 15. The oscillators 11, 12, respectively for high-speed and low-speed drive, have output frequencies equal to four times of the driving frequency of the ultrasonic wave motor 5. The oscillators 11, 12 constitute said drive signal forming circuit 10A, while the inverter 13 and the NAND gates 14-16 constitute the switching circuit 10B.

The frequency-dividing phase-shifting circuit 2 is composed of two D-flip-flops 21, 22. The set output Q of the flip-flop 21 is connected to the data input terminal D of the flip-flop 22, of which inverted set output $\bar{Q}$ is connected to the data input terminal D of the flip-flop 21. Consequently said frequency-dividing phase-shifting circuit 2 divides the frequency of a signal from the NAND gate 16 to $\frac{1}{4}$, and releases signals of a mutual phase difference of $\pi/2$.

The temporary stop circuit 3 is composed of AND gates 31, 32 and a timer 33. When the drive speed changing signal is shifted from "H" to "L" (change from high-speed drive to low-speed drive), said circuit closes the AND gates 31, 32 for a period ts determined by a capacitor C and a resistor R, thereby shifting the outputs of said AND gates 31, 32 to the "L" level, but otherwise transmits the output of the frequency-dividing phase-shifting circuit 2.

The power amplifiers 4a, 4b are of known type and are used for amplifying the output signals of the AND gates 31, 32 for supply to the electrodes 52a, 52b of the piezoelectric member 52 of the ultrasonic wave motor 5.

In the following there will be explained the function of the above-explained circuit.

Figure 3:
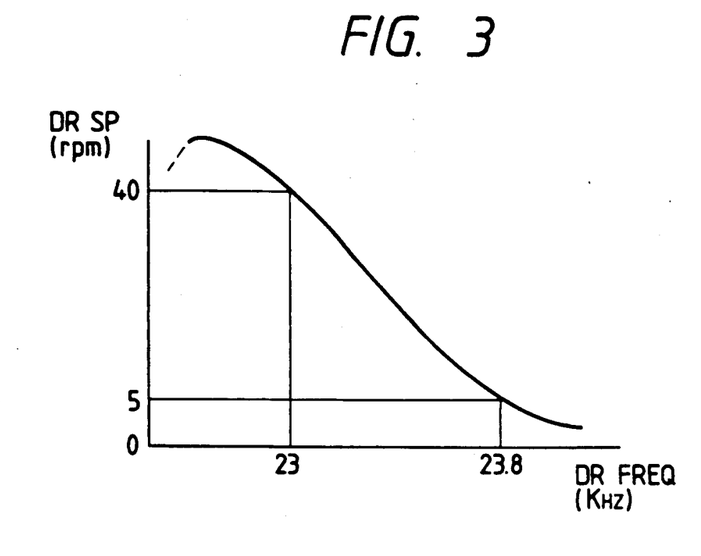
FIG. 3 is a characteristic chart showing the relation between the driving frequency and the driving speed of an ultrasonic wave motor.

FIG. 3 is a characteristic chart showing the relation between the driving frequency and the driving speed of an ultrasonic wave motor. For example, the motor 5 is driven with an AC drive signal of a driving frequency of 23 KHz for obtaining a drive speed of 40 rpm, or of a driving frequency of 23.8 KHz for obtaining a drive speed of 5 rpm. Thus the output frequency of the oscillator 12 for the high-speed drive is selected at 92 KHz ($=4\times23$), while that of the oscillator 11 for lowspeed drive is selected at 95.2 KHz ($=4\times23.8$).

Let us at first consider a case of the drive signal changing signal at the "H" level, namely a case of driving the ultrasonic wave motor 5 at the high speed of 40 rpm. Said "H"-level drive speed changing signal is supplied to the NAND gate 15 and also supplied, after inversion by the inverter 13, to the NAND gate 14. The NAND gate 15 receives the output signal of the high-speed oscillator 12 while the other NAND gate 14 receives the output signal of the low-speed oscillator 11, but, at the high-speed drive state, the inverter 13 provides an "L"-level output signal to close the NAND gate 14 and to only open the NAND gate 15, whereby the output signal of the high-speed oscillator 12 is transmitted by the NAND gates 15 and 16.

Figure 4:
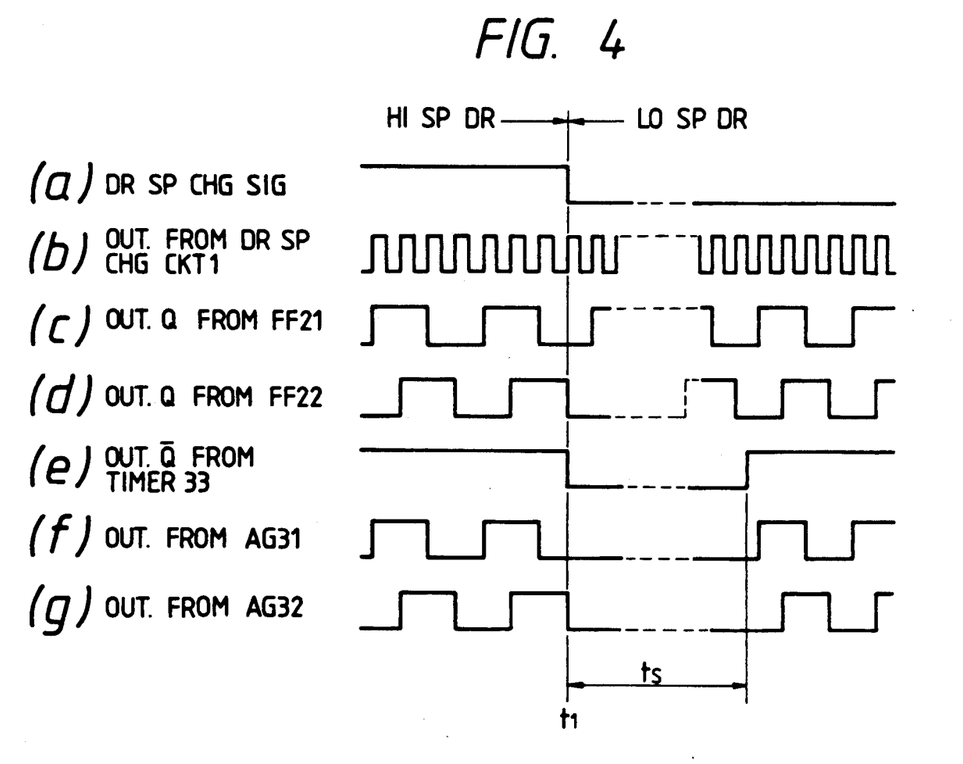
FIG. 4 is a timing chart showing various input and output signals of the embodiment shown in FIG. 1.

The output signal of the NAND gate 16, which is a square wave as shown in FIG. 4(b), is supplied to the clock input terminals of the flip-flops 21, 22 of the frequency dividing phase-shifting circuit 2. Said circuit 2, adapted to divide the frequency, to $\frac{1}{4}$, of the signal entered from the drive speed changing circuit 1, releases signals having a frequency equal to $\frac{1}{4}$ of that of the input signal from said drive speed changing circuit 1 and a mutual phase difference of $\pi/2$, as shown in FIG. 4(b) and (d), from the set output terminals Q of the flip-flops 21, 22.

Said output signals of the frequency-dividing phase-shifting circuit 2 are respectively supplied to the AND gates 31, 32 of the temporary stop circuit 3. The other input terminals of said AND gates 31, 32 receive the output signal of the inverted set output terminal $\bar{Q}$ of the timer 33. However said timer 33 is not in function because the drive speed changing signal is at the "H"-level, so that said inverted set output $\bar{Q}$ is at the "H" level. Consequently the signals supplied to the AND gates 31, 32 are transmitted as shown in FIGS. 4(f) and 4(g), applied by the power amplifiers 4a, 4b and applied to the electrodes 52a, 52b of the piezoelectric member 52 of the ultrasonic wave motor 5. Thus a bending vibration is generated in the piezoelectric member 52, and the rotor 56 is rotated.

In the following there will be explained the case of low-speed drive by switching the drive speed changing signal from "H" to "L". When said signal is shifted to the "L" level, the NAND gate 15 is closed and the NAND gate 14 is opened in the drive speed changing circuit 1, whereby the output signal of the low-speed oscillator 11 is selected by said NAND gate 14 and is transmitted by the NAND gate 16.

The frequency-dividing phase-shifting circuit 2 sends the output singal of the drive speed changing circuit 1, after frequency division, to the AND gates 31, 32 of the temporary stop circuit 3 as in the case of high-speed drive. However, at a time $t_1$ in FIG. 4, when the drive speed changing signal is shifted from "H" to "L", the timer 33 is activated whereby the inverted output terminal $\bar{Q}$ thereof releases a signal assuming the "L" level for a predetermined period $t_s$ as shown in FIG. 4(e). Thus the AND gates 31, 32 are closed for said period $t_s$ as shown in FIGS. 4(f) and 4(g), releasing "L"-level output signals. Consequently the AC input voltages to the ultrasonic wave motor 5 are intercepted for said period $t_s$, and is temporarily deactivated. In such temporary deactivated state, the vibration of the vibration member 53 is reduced in amplitude, thus rapidly increasing the frictional force between the vibration member 53 and the rotor 56, whereby the rotor 56 is rapidly decelerated.

When the output signal of the inverted output terminal $\bar{q}$ of the timer 33 returns to the "H"-level state at the expiration of the period $t_s$, the AND gates 31, 32 are opened to release signals of a frequency corresponding to the low driving speed of 5 rpm, whereby the ultrasonic wave motor 5 enters the low-speed drive state.

Figure 5:
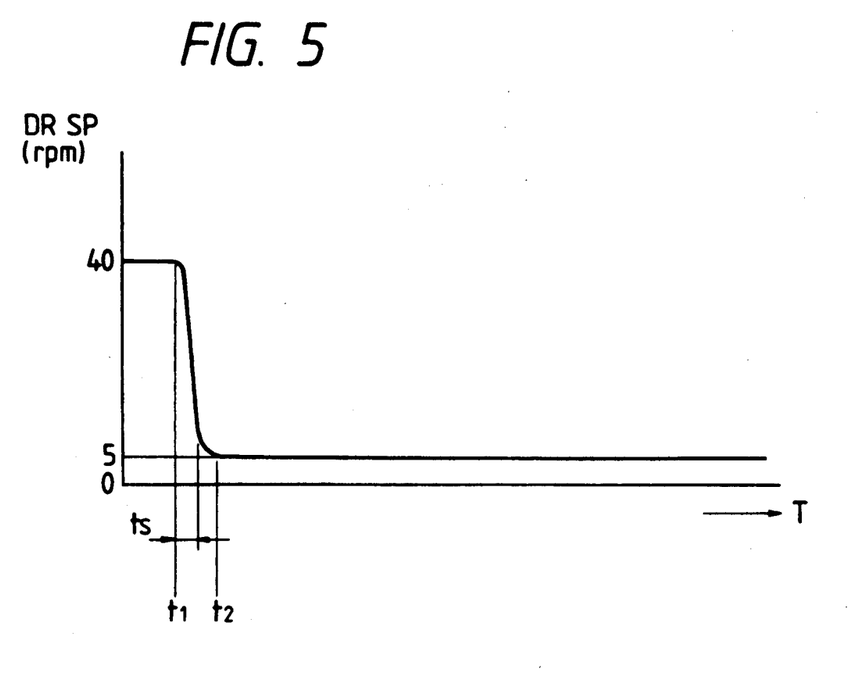
FIG. 5 is a chart showing the speed change at the switching to the low-speed state.

FIG. 5 is a chart showing the change in driving speed of the ultrasonic wave motor 5 at the switching to the low-speed drive, wherein $t_1$ is the switching time of the drive speed changing signal from "H" to "L", $t_s$ is the temporary stop period, and $t_2$ is the time when the driving speed reaches the target speed of 5 rpm. Experimentally these values were $t_s=5$ ms, and $t_1 \approx t_2 = 7$ ms.

Figure 6:
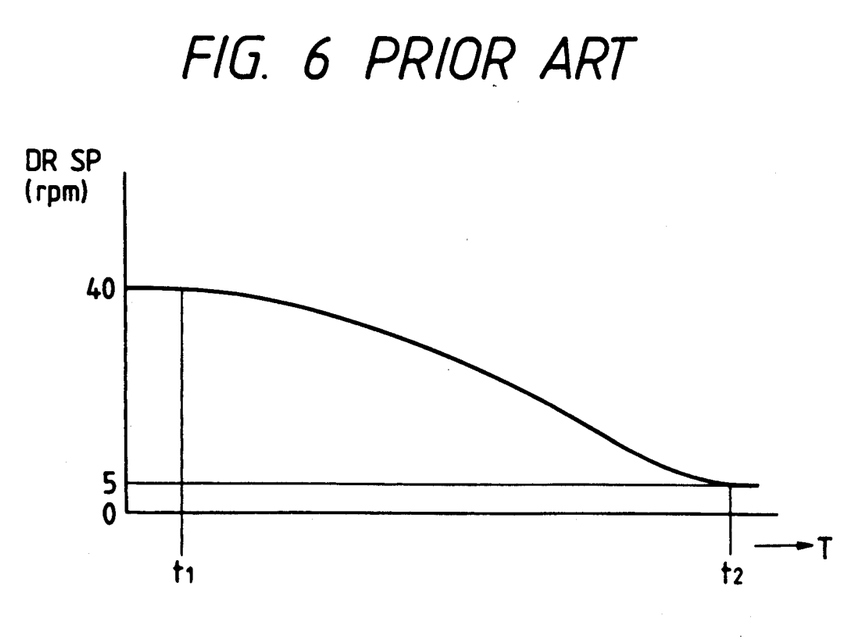
FIG. 6 is a chart showing the speed change at the switching to the low-speed state in a conventional structure.

For reference, the conventional device for switching to the low-speed drive without the temporary stop circuit 3 provides a change in the driving speed as shown in FIG. 6, in which about 50 ms is required from the switching of the drive speed changing signal at $t_1$ to the time $t_2$ when the target speed of 5 rpm is reached. Consequently the decelerating time is reduced to about 1/7 by the present invention.

The set period $t_s$ of the timer 33 can be determined, in consideration of the magnitude of load, target decelerated speed etc., by experimental measurement of the time from the temporary stop of the AC current to the arrival at the target low-speed revolution by deceleration of the rotor 56. Also the timer 33 is activated at the downshift of the drive speed changing signal but is not activated at the switching from the low-speed drive to the high-speed drive, so that the high-speed drive state is immediately reached without the temporary stopping.

As explained in the foregoing, the present embodiment interrupts the AC voltage signal supplied to the ultrasonic wave motor 5 for a period $t_s$ determined by the timer 33 at the switching from the high speed drive to the low speed drive to realize a temporary deactivated state before entering the low-speed drive state, whereby the decelerating time is significantly reduced and the target low-speed can be reached within a short time.

In the present embodiment there is selected the outputs of an oscillator for high-speed drive and an oscillator for low-speed drive, but it is also possible to change the frequency of an oscillator before and after the temporary deactivation period.

Also in case the switching of the drive speed from the high speed to the low speed has to be done in a time longer than the decelerating time $t_1-t_2$ of the present embodiment shown in FIG. 5 but shorter than the time $t_1-t_2$ shown in FIG. 6, it is possible either to select the temporary stop period $t_s$ shorter than in FIG. 5 and to apply the AC voltage signal for the low-speed drive before the drive speed is sufficiently lowered, or to select the temporary stop period $t_s$ shorter than in FIG. 5 and to alternately repeat the temporary deactivation and the application of the AC voltage signal.

Figure 11:
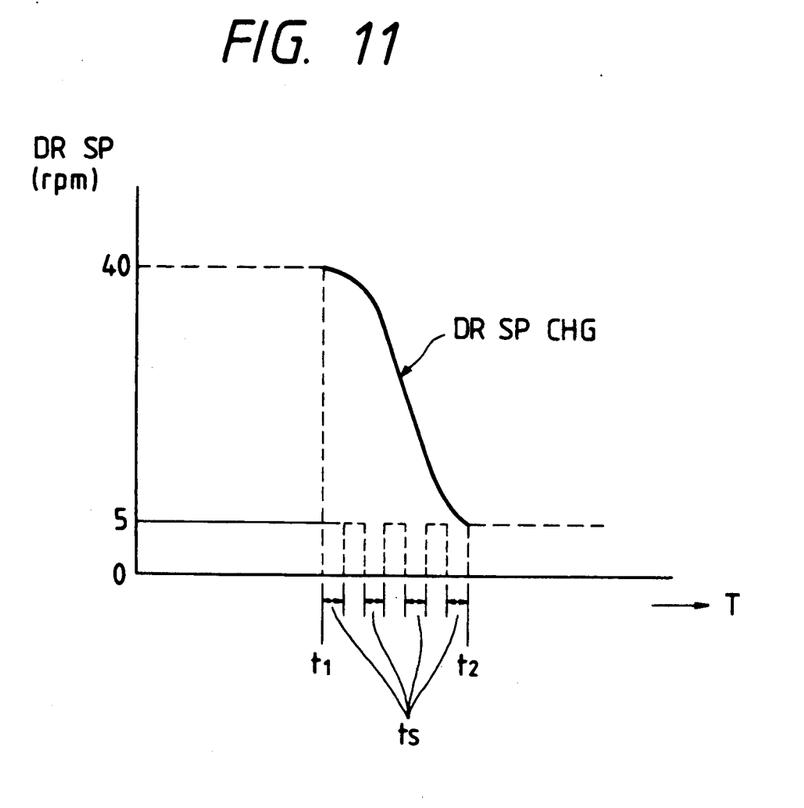
FIG. 11 is a chart showing the change in the driving speed when the application and temporary stop of the AC voltage signal are repeated.

FIG. 11 shows the above-mentioned case of repeating the temporary deactivation and the application of AC voltage signal, wherein the temporary stop period $t_s$ is selected shorter than in the case of FIG. 5. In FIG. 11, the broken line indicates the application of the AC voltage signal for high-speed drive or low-speed drive, and the solid line between t1 and t2 indicates the change in drive speed.

Also in the present embodiment, an arbitrary decelerated state can be obtained by varying the period $t_s$ between $t_1$ and $t_2$.

Second Embodiment

Figure 7:
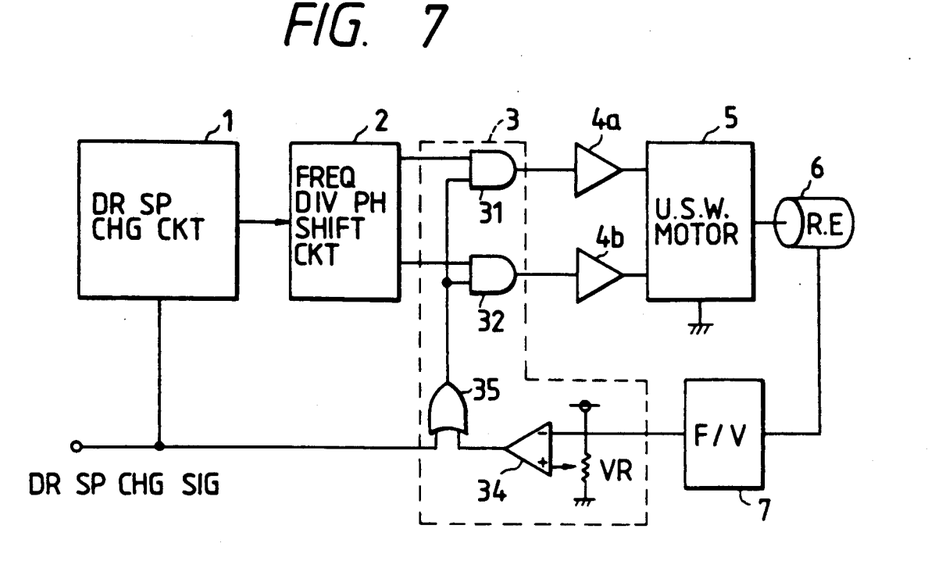
FIG. 7 is a block diagram of a second embodiment of the present invention.

FIG. 7 is a block diagram of a second embodiment of the present invention, wherein same components as those in FIG. 1 are represented by same numbers.

In this embodiment, a rotary encoder 6 connected to the rotor 56 of the ultrasonic wave motor 5, for generating pulses corresponding to the revolution of said rotor, is used to obtain a signal of a frequency corresponding to the actual revolution of said motor 5. Said signal is converted by a frequency-voltage converter 7 into a voltage signal of a corresponding level, which is supplied to a comparator 34 of the temporary stop circuit 3. Detection control means is composed of said components 3, 6 and 7. The output voltage of said F-V converter 7 is compared with a voltage determined by a variable resistor VR corresponding to the target low speed, in order to discriminate whether the actual revolution of the motor 5 has reached said target low speed. The comparator 34 releases an "L"-level output before reaching said target speed, but an "H"-level output upon reaching said target speed. The output signal of said comparator 34 is supplied, together with the drive speed changing signal, to an OR gate 35, and then to the AND gates 31, 32, of which the other input terminals receive the output signals of the frequency-dividing phase-shifting circuit 2.

Consequently, at the switching from the high-speed state to the low-speed state, the two input signals to the OR gate 35 are maintained at the "L" level until the actual revolution of the ultrasonic wave motor 5 reaches the low target speed, but the input signal from the comparator 34 returns to the "H" level when the target speed is reached. Consequently the AND gates 31, 32 are closed until the low target speed is reached, but are opened when said target speed is reached, thereby transmitting the output singals of the frequency-dividing phase-shifting circuit 2 to the power amplifiers 4a, 4b. In this manner a temporary deactivated state is realized until said target speed is reached, whereby the deceleration within a short time can be attained by an effect similar to that in the foregoing embodiment shown in FIG. 1.

The present embodiment has an advantage of not requiring re-adjustment of the timer according to the magnitude of load, since the temporary deactivation period is automatically extended or shortened according to the inertia through the detection of actual revolution of the ultrasonic wave motor 5, even if the inertia thereof varies by the load thereof. The rotary encoder 6 of the present embodiment may be replaced by a pulse generating pattern formed or mounted on the rotor 56.

Third Embodiment

Figure 8:
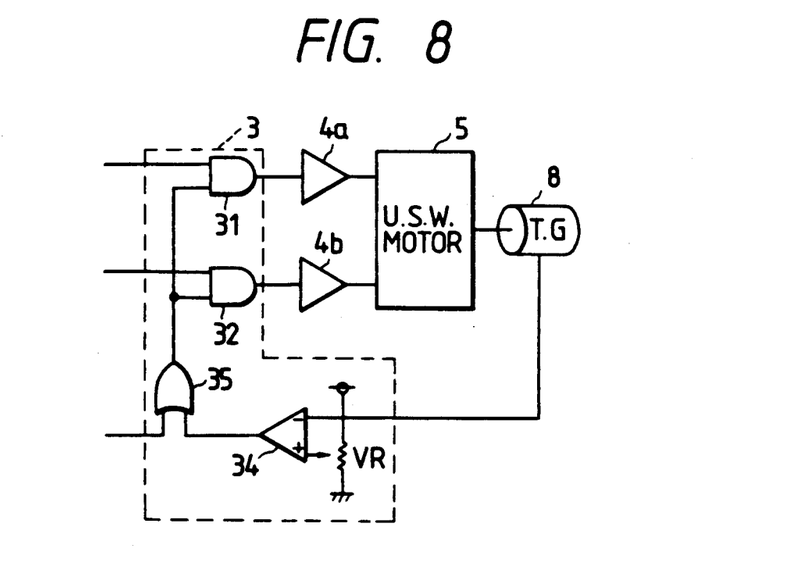
FIG. 8 is a block diagram of a third embodiment of the present invention.

As shown in FIG. 8, the rotary encoder 6 in the second embodiment may be replaced by a tachogenerator 8 for dispensing with the F-V converter 7. In this case, the detection control means is composed of the components 3 and 8.

Fourth embodiment

Figure 9:
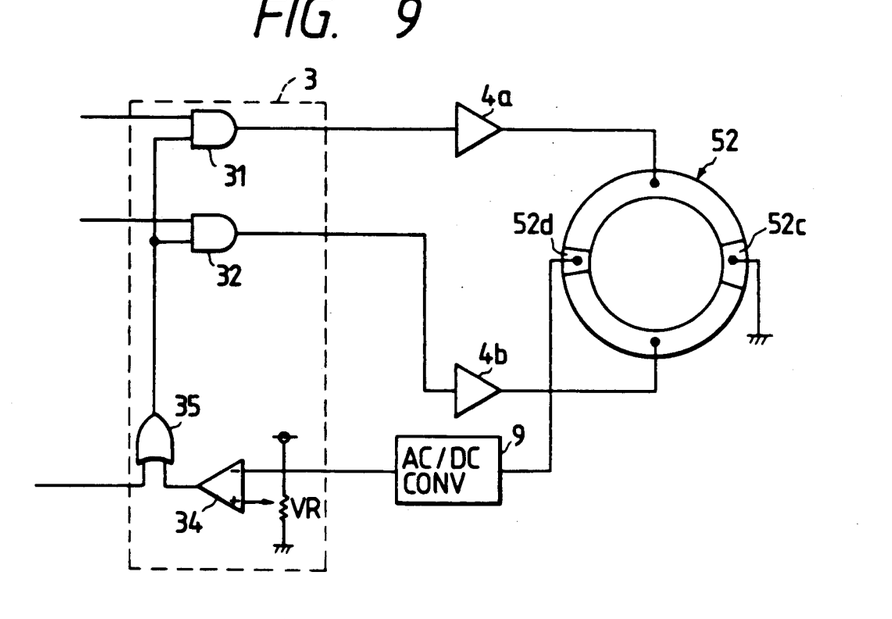
FIG. 9 is a block diagram of a fourth embodiment of the present invention.

FIG. 9 is a block diagram showing a fourth embodiment, in which an AC voltage obtained from the monitor electrode 52d of the piezoelectric member 52 is converted by an AC/DC converter 9 into a DC voltage, which is supplied to a comparator 34 similar to that in the embodiment shown in FIG. 7.

The amplitude of vibration of the vibration member 53 decreases with the revolution. Thus, by setting a voltage corresponding to the amplitude at the desired low-speed state as the reference voltage determined by the variable resistor VR for the comparator 34, the output signal thereof assumes the "L" state until the actual revolution of the ultrasonic wave motor 5 reaches the target speed but assumes the "H" state after reaching said target speed. The output signal of the comparator 34 is supplied to the OR gate as in the embodiment shown in FIG. 7, so that the present embodiment can provide an advantage similar to that in the embodiment shown in FIG. 7.

In the foregoing embodiments, the temporary deactivated state is generated by intercepting the AC voltage signals by gate signals, but said input voltages may be mechanically intercepted for example by relays or switches.

Also in case of decelerating, the ultrasonic wave motor 5 by changing the input voltage thereto, a similar effect can be obtained by reducing the input voltage temporarily to zero, at the switching from the high-speed drive state to the low-speed drive state.

Fifth Embodiment

Figure 10:
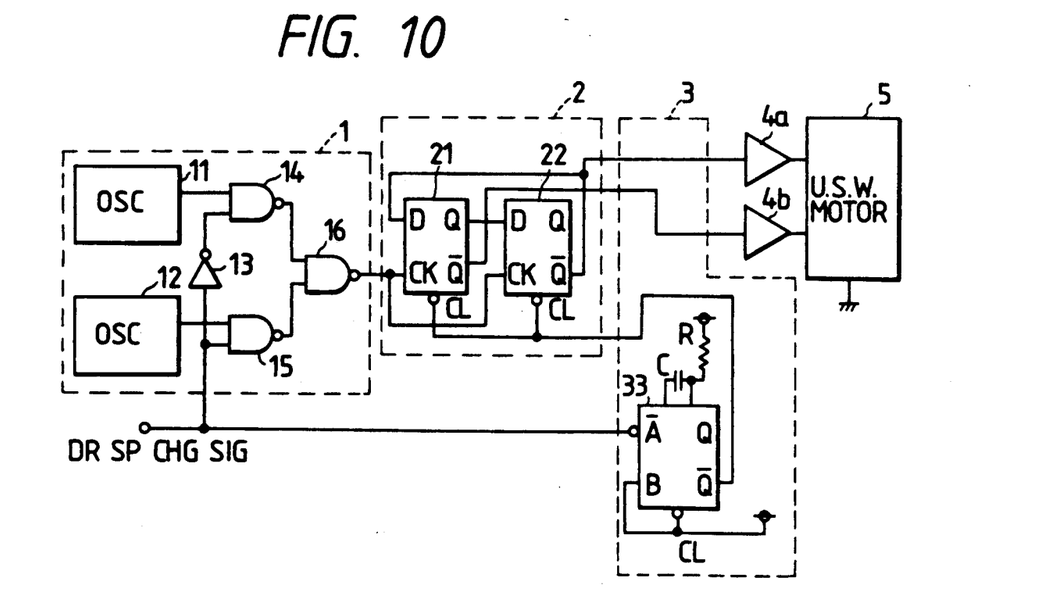
FIG. 10 is a block diagram of a fifth embodiment of the present invention.

This embodiment attains the temporary deactivated state by changing the applied AC voltage temporarily to a DC voltage. This embodiment is shown in FIG. 10. The output signal of the inverted output terminal $\bar{Q}$ of the timer 33 is supplied to the clear terminals of the flip-flops 21, 22. Thus, during the activated state of the timer 33, the flip-flops 21, 22 are maintained in the reset state, and the power amplifiers 4a, 4b directly receive the output signals of the inverted set output terminals $\bar{Q}$ of the flip-flops 22, 21. Consequently, during the activated period of the timer 33, the ultrasonic wave motor 5 receives "H"-level DC components with zero frequency, whereby an effect as in the embodiment of FIG. 1 can be obtained.

The present invention is naturally applicable also to a ultrasonic linear motor.

As explained in the foregoing, the present invention allow to decelerate an ultrasonic wave motor within a short time to a low-speed drive state, by reducing the frequency of the AC voltage signal, supplied to the piezoelectric member of said motor, to zero during a predetermined period at the switching from the high-speed drive state to the low-speed drive state.

What is claimed is:

1. A driving device for an ultrasonic wave motor provided with:
    a stator member having an electrostrictive member and a resilient member and adapted to generate a travelling vibration wave in said resilient member by excitation with said electrostrictive member; and
    a moving member maintained in pressure contact with said stator member and driven by said travelling vibration member; comprising:
    drive signal forming means for forming AC voltage signals for high-speed drive and low-speed drive, for application to said electrostrictive member;
    wherein said electrostrictive member is excited into vibration by said AC voltage signal;
    switch means for selectively switching the AC voltage signals of high-speed drive and low-speed drive for application to said electrostrictive member; and
    temporary stop means for reducing the frequency of the AC voltage signal, applied to said electrostrictive member, to zero at least once at the switching from the high-speed drive state to the low-speed drive state.

2. A driving device for ultrasonic wave motor according to claim 1, wherein said temporary stop means sets the frequency of said AC voltage signal at zero by intercepting said signal for a predetermined period.

3. A driving device for ultrasonic wave motor according to claim 1, wherein said temporary stop means sets the frequency of said AC voltage signal at zero by solely supplying the DC component thereof.

4. A driving device for ultrasonic wave motor according to claim 1, further comprising:
    detection/control means for detecting the drive speed of said ultrasonic wave motor, and, at the switching from the high-speed drive state to the low-speed drive state, activating said temporary stop means to set the frequency of the AC voltage signal at zero until the detected drive speed is reduced to a predetermined drive speed corresponding to the low-speed drive state.

5. A driving device for ultrasonic wave motor according to claim 4, wherein said detection/control means comprises a rotary encoder connected to the moving member of said ultrasonic wave motor, and a frequency-voltage converter.

6. A driving device for ultrasonic wave motor according to claim 4, wherein said detection/control means comprises a tachogenerator connected to the moving member of said ultrasonic wave motor.

7. A driving device for ultrasonic wave motor according to claim 1, further comprising:
    a monitor electrode capable of releasing a AC voltage signal; and
    control means for detecting the drive speed of said ultrasonic wave motor from the AC voltage obtained from said monitor electrode, and, at the switching from the high-speed drive state to the low-speed drive state, activating said temporary stop means to set the frequency of the AC voltage signal at zero until the detected drive speed is reduced to a predetermined drive speed corresponding to the low-speed drive state.

* * * * *